US011384786B2

(12) United States Patent
Tejero Salinero et al.

(10) Patent No.: US 11,384,786 B2
(45) Date of Patent: Jul. 12, 2022

(54) WELDABLE NUT PLATE

(71) Applicant: ILLINOIS TOOL WORKS INC., Glenview, IL (US)

(72) Inventors: Isaac Tejero Salinero, Sabadell (ES); Christoph Leidig, Rothenburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 283 days.

(21) Appl. No.: 16/348,229

(22) PCT Filed: Nov. 20, 2017

(86) PCT No.: PCT/US2017/062486
§ 371 (c)(1),
(2) Date: May 9, 2019

(87) PCT Pub. No.: WO2018/094308
PCT Pub. Date: May 24, 2018

(65) Prior Publication Data
US 2020/0063781 A1 Feb. 27, 2020

(30) Foreign Application Priority Data

Nov. 21, 2016 (DE) ...................... 10 2016 122 323.9

(51) Int. Cl.
*F16B 37/06* (2006.01)
*B23K 11/11* (2006.01)
(Continued)

(52) U.S. Cl.
CPC ............ *F16B 37/061* (2013.01); *B23K 11/11* (2013.01); *B23K 35/004* (2013.01);
(Continued)

(58) Field of Classification Search
CPC ..... F16B 37/061; B23K 11/11; B23K 35/004; B23K 35/0255; B23K 2101/006;
(Continued)

(56) References Cited

U.S. PATENT DOCUMENTS 2,766,517 A * 10/1956 Ericson ................ B23K 11/105
29/16
4,381,940 A * 5/1983 Watanabe ............... C22C 38/32
420/105
(Continued)

FOREIGN PATENT DOCUMENTS

CN 105369259 3/2016
CN 105422590 3/2016
(Continued)

OTHER PUBLICATIONS

PCT, International Search Report and Written Opinion, International Application No. PCT/US2017/062486; dated Feb. 16, 2018, 12 pages.

*Primary Examiner* — Pinel E Romain
(74) *Attorney, Agent, or Firm* — Thompson Hine LLP

(57) ABSTRACT

A car body (1) includes a nut plate (2) predominantly made of hardened steel, wherein the hardened steel of the nut plate (2) is welded directly to the car body (1). A nut plate (2) as for use in direct welding to a car body (1) is also provided. A method for mounting a nut plate (2), which is predominantly made of hardened steel, to a car body (1), wherein the method involves welding the hardened steel of the nut plate (2) to the car body (1).

17 Claims, 1 Drawing Sheet

(51) Int. Cl.
*B23K 35/00* (2006.01)
*B23K 35/02* (2006.01)
*C22C 38/00* (2006.01)
*C22C 38/02* (2006.01)
*C22C 38/04* (2006.01)
*C22C 38/32* (2006.01)
*B23K 101/00* (2006.01)

(52) U.S. Cl.
CPC ........ *B23K 35/0255* (2013.01); *C22C 38/002* (2013.01); *C22C 38/02* (2013.01); *C22C 38/04* (2013.01); *C22C 38/32* (2013.01); *B23K 2101/006* (2018.08)

(58) Field of Classification Search
CPC ....... C22C 38/002; C22C 38/02; C22C 38/04; C22C 38/32
USPC ...................................................... 296/187.01
See application file for complete search history.

(56) References Cited

U.S. PATENT DOCUMENTS

| | | | | |
|---|---|---|---|---|
| 4,521,258 A | * | 6/1985 | Tamehiro | C21D 8/0226 148/505 |
| 8,967,703 B2 | * | 3/2015 | Wawers | B62D 21/157 296/193.06 |
| 9,708,685 B2 | * | 7/2017 | Teague | C21D 1/673 |
| 9,862,058 B2 | * | 1/2018 | Breuer | B23K 35/0261 |
| 2007/0000117 A1 | | 1/2007 | Brandstatter | |
| 2007/0011720 A1 | | 1/2007 | Patberg | |
| 2010/0117400 A1 | * | 5/2010 | Eberlein | B62D 25/04 296/193.01 |
| 2011/0101735 A1 | * | 5/2011 | Fujita | B62D 25/082 296/193.06 |
| 2012/0164472 A1 | | 6/2012 | Kuhn | |
| 2017/0058936 A1 | * | 3/2017 | Han | F16B 37/061 |
| 2017/0355008 A1 | * | 12/2017 | Potocki | B21D 39/00 |

FOREIGN PATENT DOCUMENTS

| | | | |
|---|---|---|---|
| CN | 105443545 | | 3/2016 |
| DE | 102004054795 | | 5/2006 |
| DE | 102008044523 | | 3/2010 |
| EP | 2177641 | | 4/2010 |
| EP | 2290133 | | 3/2011 |
| JP | H02 290922 | | 11/1990 |
| JP | 2012 082890 | | 4/2012 |
| JP | 2012 179646 | | 9/2012 |
| KR | 20140002272 A | * | 1/2014 |

* cited by examiner

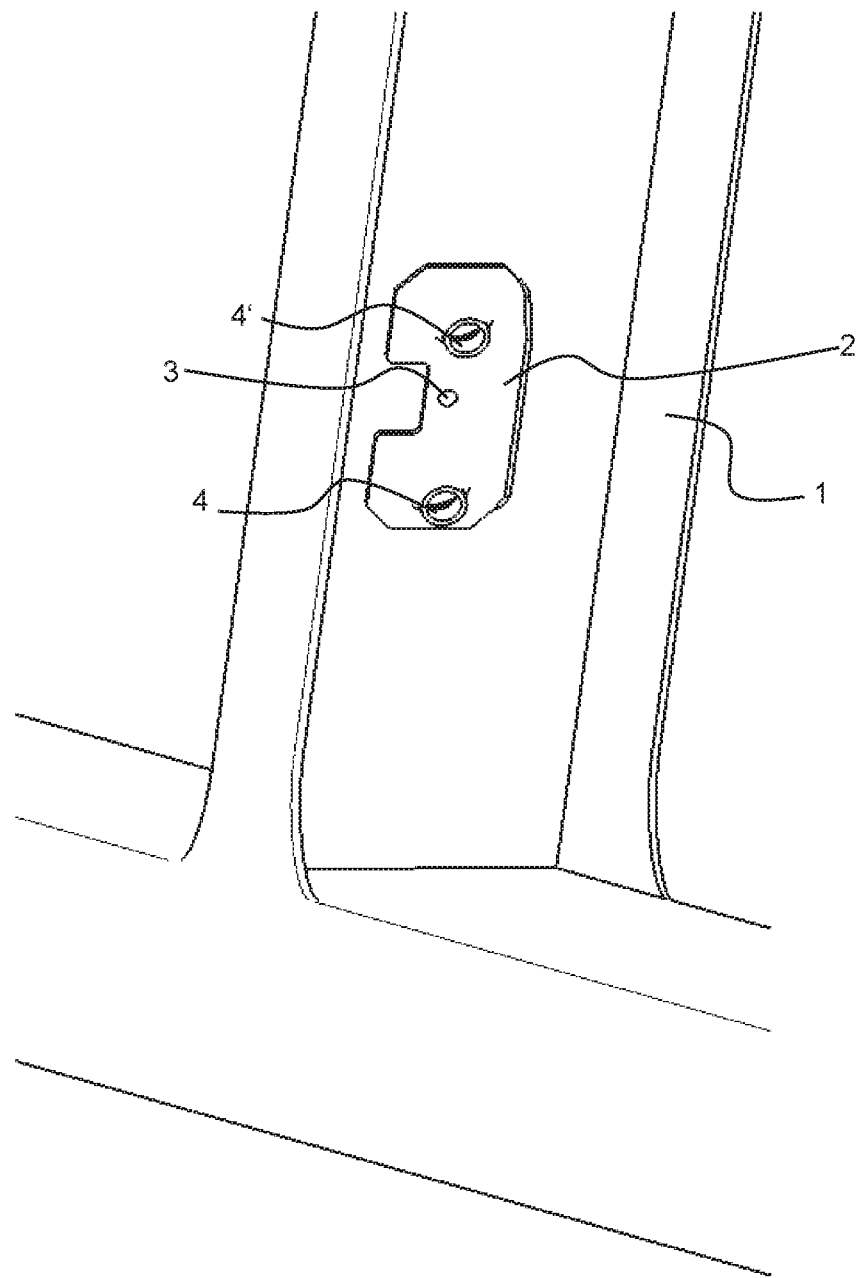

WELDABLE NUT PLATE

TECHNICAL FIELD

The invention relates to a nut plate for a car body, and to a car body having a nut plate, and to a method for mounting a nut plate on a car body.

BACKGROUND

According to the prior art, nut plates made of steel are hardened in order to achieve adequate mechanical stability with little material thickness and thus low weight. However, the steels used for this (e.g. C50E) cannot be welded after hardening and it is therefore necessary to attach to the nut plate an additional weld rivet which is then welded to the vehicle body.

The inventors found this to be disadvantageous primarily because the provision of an additional weld rivet gives rise to increased assembly costs. The present invention has the object of improving these disadvantages. Said object is achieved by means of the independent claims. Advantageous refinements are defined in the subclaims.

SUMMARY

The object is achieved in particular with a car body comprising a nut plate predominantly, and preferably entirely, made of hardened steel, preferably a nut plate for mounting a hinge, for example for the luggage space cover or the engine bay cover or a side door, or for mounting a door/cover latch or a door/cover retainer, by means of the nut plate, to the car body, wherein the hardened steel of the nut plate is welded directly to the car body.

The object is also achieved in particular with a nut plate predominantly made of hardened steel having preferred further properties which are described below.

The object is also achieved in particular with a method for mounting a nut plate, which is predominantly, and preferably entirely, made of hardened steel, to a car body, wherein the nut plate is made of hardened steel and the method comprises welding the hardened steel of the nut plate to the car body.

As a result, it is not necessary to provide the nut plate with one or more weld rivets which are usually riveted to the nut plate by means of one or more openings in the nut plate and then welded to the car body. The nut plate is preferably in one piece. It preferably has an opening with an internal thread and/or a rod-like section with an external thread. It preferably has, around the thread, a plate-like section which comes to bear against the vehicle body. Preferably, welding locally melts together the hardened steel of the nut plate and the material of the vehicle body. The hardened steel is preferably hardened by heat treatment, preferably by bainitizing. The nut plate is preferably hardened by heat treatment, preferably by bainitizing, such that it is predominantly made of hardened steel.

In another exemplary embodiment of the present invention, the hardened steel comprises boron B, preferably 0.0012-0.006 weight % of B, particularly preferably 0.0015-0.005 weight % of B. The inventors have found that in particular boron-alloyed steels have good weldability even after hardening, in particular since the carbon fraction can be reduced without excessively impairing the strength.

In another exemplary embodiment of the present invention, the hardened steel comprises manganese Mn, preferably 0.8-1.6 weight % of Mn, particularly preferably 1-1.3 weight % of Mn. Preferably, the hardened steel with manganese-boron is a 22MnB5 steel.

In another exemplary embodiment of the present invention, the hardened steel comprises chromium Cr, preferably 0.11-0.31 weight % of Cr, particularly preferably 0.14-0.26 weight % of Cr.

In another exemplary embodiment of the present invention, the hardened steel comprises carbon C, preferably 0.16-0.3 weight % of C, particularly preferably 0.2-0.25 weight % of C.

In another exemplary embodiment of the present invention, the hardened steel comprises silicon Si and/or phosphor P and/or sulfur S, preferably 0.16-0.42 weight % of Si and/or at most 0.04 weight % of P and/or at most 0.012 weight % of S, particularly preferably 0.2-0.35 weight % of Si and/or at most 0.03 weight % of P and/or at most 0.01 weight % of S.

In another exemplary embodiment of the present invention, the hardened steel of the nut plate is welded to the car body by spot welding. In another method according to invention, the hardened steel of the nut plate is welded by spot welding.

In another exemplary embodiment, the hardened steel has the following materials:

| | weight % | | | |
|---|---|---|---|---|
| | preferably | | particularly preferably | |
| | from | to | from | to |
| B | 0.0012 | 0.006 | 0.0015 | 0.005 |
| Mn | 0.8 | 1.6 | 1 | 1.3 |
| C | 0.16 | 0.3 | 0.2 | 0.25 |
| Cr | 0.11 | 0.31 | 0.14 | 0.26 |
| Si | 0.16 | 0.42 | 0.2 | 0.35 |
| | maximum | | maximum | |
| P | 0.04 | | 0.03 | |
| S | 0.012 | | 0.01 | |

BRIEF DESCRIPTION OF THE DRAWINGS

FIG. 1 shows a portion of a car body including a nut plate.

DETAILED DESCRIPTION

There follows a further explanation of the invention with reference to a drawing, FIG. 1. The car body 1 has a nut plate 2 predominantly made of hardened steel. The hardened steel of the nut plate 2 is welded directly to the car body 1.

In this specific example, the nut plate 2 is welded by means of a spot welding method at a welding spot 3. It also has two openings with internal threads 4, 4', here in the form of bushings.

The hardened steel has the following materials:

| | |
|---|---|
| B: | 0.00175 weight % |
| Mn: | 0.15 weight % |
| C: | 0.025 weight % |
| Cr: | 0.06 weight % |
| Si: | 0.075 weight % |
| P: | 0.015 weight % |
| S: | 0.005 weight % |

LIST OF REFERENCE NUMERALS

| | |
|---|---|
| 1 | Car body |
| 2 | Nut plate |
| 3 | Welding spot |
| 4 | Thread |

The invention claimed is:

1. A car body comprising:
 a nut plate predominantly made of hardened steel, wherein the hardened steel of the nut plate is welded directly to a portion of the car body,
 wherein the hardened steel comprises:
 0.0012-0.006 weight % of boron B;
 0.8-1.6 weight % of manganese Mn;
 0.16-0.3 weight % of carbon C;
 0.16-0.42 weight % of silicon Si;
 at most 0.04 weight % of phosphor P; and
 at most 0.012 weight % of sulfur S.

2. The car body according to claim 1, wherein the hardened steel of the nut plate is welded directly to the portion of the car body by spot welding.

3. The car body of claim 1, wherein the hardened steel is 0.0015-0.005 weight % of boron B.

4. The car body of claim 3, wherein the hardened steel is 1-1.2 weight % of manganese Mn.

5. The car body of claim 4, wherein the hardened steel is 0.2-0.25 weight % of carbon C.

6. A nut plate for use in a car body, the nut plate predominantly made of hardened steel, wherein the hardened steel comprises:
 0.0012-0.006 weight % of boron B;
 0.8-1.6 weight % of manganese Mn;
 0.16-0.3 weight % of carbon C;
 0.16-0.42 weight % of silicon Si;
 at most 0.04 weight % of phosphor P; and
 at most 0.012 weight % of sulfur S.

7. The nut plate of claim 6, wherein the hardened steel is 0.0015-0.005 weight % of boron B.

8. The nut plate of claim 7, wherein the hardened steel is 1-1.2 weight % of manganese Mn.

9. The nut plate of claim 8, wherein the hardened steel is 0.2-0.25 weight % of carbon C.

10. A method of mounting the nut plate of claim 6 to a car body, comprising:
 welding the hardened steel of the nut plate directly to the car body.

11. A vehicle attachment system, comprising:
 a car body portion with the nut plate of claim 6 welded directly to the car body portion.

12. A nut plate for use in a car body, the nut plate predominantly made of hardened steel, wherein the hardened steel consists of:
 0.0012-0.006 weight % of boron B;
 0.8-1.6 weight % of manganese Mn;
 0.16-0.3 weight % of carbon C;
 0.16-0.42 weight % of silicon Si;
 at most 0.04 weight % of phosphor P;
 at most 0.012 weight % of sulfur S; and
 a balance being iron Fe.

13. The nut plate of claim 12, wherein the hardened steel is 0.0015-0.005 weight % of boron B.

14. The nut plate of claim 13, wherein the hardened steel is 1-1.2 weight % of manganese Mn.

15. The nut plate of claim 14, wherein the hardened steel is 0.2-0.25 weight % of carbon C.

16. A method of mounting the nut plate of claim 12 to a car body, comprising:
 welding the hardened steel of the nut plate directly to the car body.

17. A vehicle attachment system, comprising:
 a car body portion with the nut plate of claim 12 welded directly to the car body portion.

* * * * *